Dec. 13, 1938.    L. R. MARTIN    2,139,763
CENTRIFUGAL GOVERNOR
Filed Aug. 10, 1937

Lawrence R. Martin
INVENTOR
BY
ATTORNEYS

Patented Dec. 13, 1938

2,139,763

UNITED STATES PATENT OFFICE 2,139,763

CENTRIFUGAL GOVERNOR

Lawrence R. Martin, Rochester, N. Y., assignor to Eastman Kodak Company, Rochester, N. Y., a corporation of New Jersey Application August 10, 1937, Serial No. 158,360

5 Claims. (Cl. 188—184)

The present invention relates to a speed responsive device of the centrifugal type and more particularly to a centrifugal governor including weight members which are mounted for movement by centrifugal forces.

Centrifugal governors of this general type are well known and have been extensively used in the motion picture and phonograph arts. However, in devices to be operated at different speeds the highest of which is several times the lowest speed, it is difficult to obtain good regulation at the lower speeds because the resilient means must have considerable resistance for operation at the higher speeds. As a result, the axial displacement of the friction disc is relatively small at low speeds and considerably greater at the higher speeds.

The primary object of the present invention is the provision of a centrifugal governor with good speed regulation both at low speeds and at high speeds, which are a multiple of the low speeds.

Another object of the invention is the provision of a cam surface on the friction member of a centrifugal governor, which cam surface is arranged inversely to vary the axial displacement of the friction member with increase in rotational speeds of the governor and which cam surface may be varied in manufacture to obtain the desired regulation with a given resilient means for the governor.

A further object of the invention is the provision of a centrifugal governor in which the weight members are mounted for rotation about axes parallel to the axis of rotation and which weight members have actuating portions engaging a cam surface on the friction disc for the aforementioned inverse variation of the axial displacement of the friction disc with increase in speeds.

Other and further objects of the invention will be apparent to those skilled in the art from the following description.

The above and other objects of the invention are attained in a centrifugal governor having a rotor, a plurality of weight members including actuating portions, a brake means including a friction disc, a resilient means for resisting axial displacement of the friction disc and a cam means on said friction disc located to be engaged by the actuating portions of the weight members and arranged to decrease the rate of axial displacement of said friction member as said weight members are moved by reason of increased rotational speeds of the governor.

Reference is hereby made to the drawing wherein like reference characters designate similar elements and wherein.

The centrifugal governor may be supported in any suitable manner in the device to be controlled and for instance may be mounted between the mechanism plates 10 and 11. Said governor also includes a rotor which comprises a shaft 12 mounted for rotation in the bushings 10' and 11' on the respective mechanism plates 10 and 11, a gear 13 secured to shaft 12 and driven from a gear on the device to be controlled, and a supporting disc 14 also secured to shaft 12 at the other end of the governor. Such rotor will be driven for rotation about the axis of shaft 12.

Figure 2:
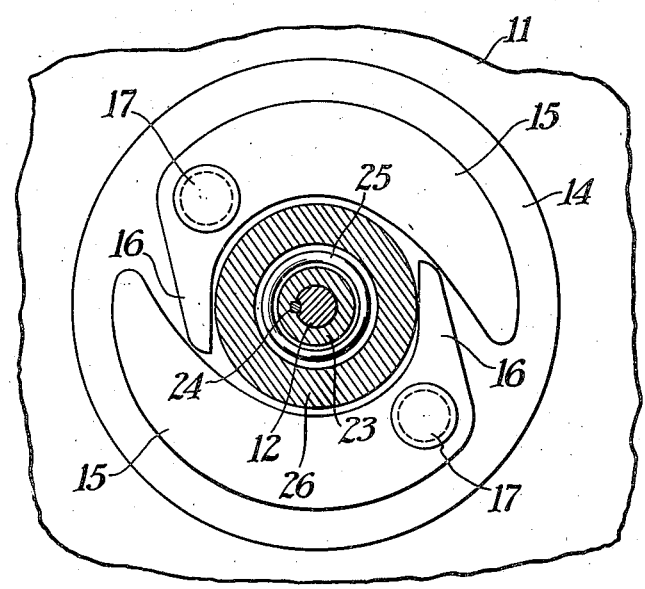
Fig. 2 is a horizontal section through the centrifugal governor of the invention and taken on the line 2—2 of Fig. 1.

A plurality of weight members are movably mounted upon the aforementioned rotor. Such weight members may comprise an arcuate weight 15 and an actuating portion 16. Said weight members are mounted for rotation about axes parallel to the axis of rotation through shaft 12 by means of headed studs 17 passing through arcuate weights 15 and fastened to supporting disc 14. It will be obvious that upon rotation of the rotor of the centrifugal governor that the arcuate weights 15 will swing or tend to swing in a counter-clockwise direction with respect to Fig. 2 under the influence of the centrifugal forces created therein by such rotation.

A brake means of conventional design is provided for the centrifugal governor and comprises a brake shoe 18 mounted upon a stud 19 which is threaded through mechanism plate 10 and which carries an adjusting knob 20 with a pointer 21. Said brake means also includes a friction member rotatable with the rotor but axially movable with respect thereto. By way of example such a friction member is disclosed as a friction disc 22 having a bearing sleeve 23. Said friction disc 22 is connected for rotation with shaft 12 by a key 24 engaging keyways in shaft 12 and in bearing sleeve 23. As a result, friction disc 22 must rotate with the rotor and shaft 12 but may be moved axially thereof along the key 24.

A resilient means is provided to act upon the friction member of the brake means and to resist axial movement thereof. Such a resilient means may comprise a coil spring 25 encircling shaft 12 and bearing at its opposite ends against gear 13 and friction disc 22.

Figure 1:
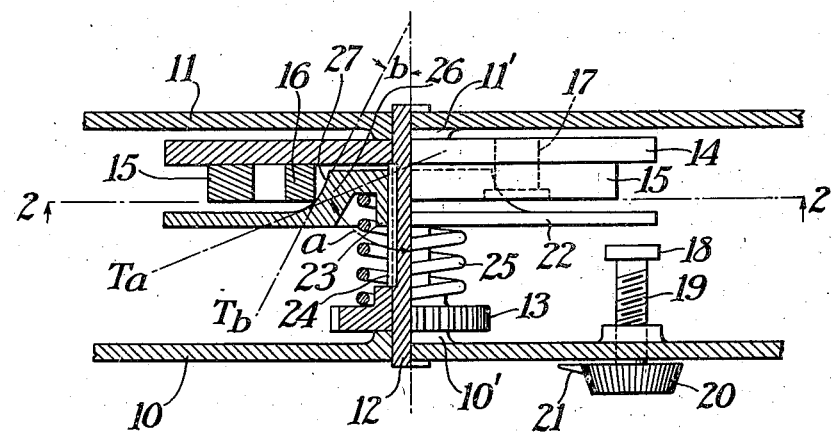
Fig. 1 is a side elevation of the centrifugal governor according to the invention and with a partial section taken through the center thereof.

The advantageous inverse variation of axial movement of the friction member with increase in rotational speeds of the governor is obtained by the provision of a cam means on said friction member and located to be engaged by the actuating portions 16 of the weight members. Such a cam means may be provided as best illustrated in Fig. 1 and includes a cam portion 26 on friction disc 22, which cam portion is provided with a concave curved surface 27. Said curved surface 27 has a radial slope decreasing toward the axis of rotation. Decrease in radial slope toward the axis of rotation means that tangents to the curved surface make a smaller angle with said axis of rotation as said tangents approach the axis. This condition is illustrated in Fig. 1 wherein the tangent T$a$ makes the angle $a$ with the axis of rotation, while the tangent T$b$, has its point of tangency radially nearer the axis of rotation and makes a smaller angle, angle $b$, with said axis of rotation.

The effect of curved surface 27 could be described in still another way. Since the resilient means or coil spring 25 acts through friction disc 22 and cam portion 26 to oppose rotation of the weight members, it could be stated that the curved surface 27 bestows an increasing mechanical advantage upon the spring to offer increased resistance to movement of the weight members at the higher speeds. According to either view of the contribution of the cam means to governor regulation, it is clear that such regulation is greatly improved since the axial displacement of the friction member is greater at the lower speeds and less at the higher speeds.

Since variations of the cam surface according to the invention are obvious, such as the use of two or more plane surfaces to approximate the concave curvature of surface 27, the present disclosure is to be construed in an illustrative sense.

Having now particularly described my invention, what I desire to secure by Letters Patent of the United States and what I claim is:

1. In a speed responsive device of the centrifugal type, the combination with a rotor mounted for rotation about an axis, a plurality of weight members each including an actuating portion and each movably mounted on said rotor, a brake means including a brake shoe and a friction member mounted for rotation with said rotor but axially movable with respect thereto, and a resilient means urging said friction member toward the actuating portions of said weight members, of a cam means on said friction member, located so as to be engaged by said actuating portions and having a surface arranged to decrease the rate of axial displacement of said friction member by said actuating portions as said weight members are moved by reason of increased rotational speed of said rotor.

2. In a speed responsive device of the centrifugal type, the combination with a rotor mounted for rotation about an axis, a plurality of weight members each including an actuating portion and each movably mounted on said rotor, a brake means including a brake shoe and a friction member mounted for rotation with said rotor but axially movable with respect thereto, and a resilient means urging said friction member toward the actuating portions of said weight members, of a cam means on said friction member, having a cam surface located so as to be engaged by said actuating portions of the weight members and arranged inversely to vary the axial displacement of said friction member with increase in rotational speed of said device.

3. In a speed responsive device of the centrifugal type, the combination with a rotor mounted for rotation about an axis, a plurality of weight members each including an actuating portion and each movably mounted on said rotor, a brake means including a brake shoe and a friction member mounted for rotation with said rotor but axially movable with respect thereto, and a resilient means urging said friction member toward the actuating portions of said weight members, of a cam means on said friction member, having a curved surface of radial slope decreasing toward the axis of rotation, located so as to engage said actuating portions and bestow an increasing mechanical advantage on said resilient means for increasing resistance to axial movement of said friction member by said weight members upon increase in rotational speed.

4. In a speed responsive device of the centrifugal type, the combination with a rotor mounted for rotation about an axis, a plurality of weight members each including an actuating portion and each movably mounted on said rotor, a brake means including a brake shoe and a friction member mounted for rotation with said rotor but axially movable with respect thereto, and a resilient means urging said friction member toward the actuating portions of said weight members, of a cam means on said friction member having a concave curved surface which has a radial slope decreasing toward the axis of rotation and which is located so as to be engaged by said actuating portions.

5. In a speed responsive device of the centrifugal type, the combination with a rotor mounted for rotation about an axis, a plurality of weight members each including an actuating portion and each mounted on said rotor for rotation about an axis parallel to the axis of rotation, a brake means including a brake shoe and a friction member mounted for rotation with said rotor but axially slidable with respect thereto, and a resilient means urging said friction member toward the actuating portions of said weight members, of a cam surface on said friction member located so as to be engaged by said actuating portions of the weight members.

LAWRENCE R. MARTIN.